(12) United States Patent
Shinkai (10) Patent No.: US 8,954,533 B2
(45) Date of Patent: Feb. 10, 2015

(54) SERVER UNIT, BROWSING SYSTEM AND DELIVERY METHOD

(71) Applicant: FUJIFILM Corporation, Tokyo (JP)

(72) Inventor: Yasuhiro Shinkai, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 233 days.

(21) Appl. No.: 13/711,496

(22) Filed: Dec. 11, 2012

(65) Prior Publication Data
US 2013/0159459 A1    Jun. 20, 2013

(30) Foreign Application Priority Data

Dec. 14, 2011    (JP) .................................. 2011-273102

(51) Int. Cl.
*G06F 15/16*    (2006.01)
*H04L 29/08*    (2006.01)
*H04W 4/18*    (2009.01)

(52) U.S. Cl.
CPC .......... *H04L 67/02* (2013.01); *H04W 4/18* (2013.01)
USPC ............................ 709/217; 709/203; 709/219

(58) Field of Classification Search
CPC ...................... G06F 17/30899; H04L 29/08
USPC .................... 709/202–203, 216, 217–219; 707/999.01, 999.009
See application file for complete search history.

(56) References Cited

U.S. PATENT DOCUMENTS

| 6,883,001 B2 * | 4/2005 | Abe ............................. 709/218 |
| 7,502,819 B2 * | 3/2009 | Alonso ......................... 709/219 |
| 2013/0054675 A1 * | 2/2013 | Jenkins et al. ............... 709/203 |

FOREIGN PATENT DOCUMENTS

| JP | 2006-221337 A | 8/2006 |
| JP | 2006-260231 | 9/2006 |
| JP | 2011-033850 A | 2/2011 |

OTHER PUBLICATIONS

Notification of Reason(s) for Rejection dated Dec. 11, 2013, with partial English translation.

* cited by examiner

*Primary Examiner* — Bharat N Barot
(74) *Attorney, Agent, or Firm* — McGinn IP Law Group, PLLC (57) ABSTRACT

A server unit includes a browsing request receiving device that receives a browsing request for a piece of content including one or multiple pages from a display unit; a user discriminating device that discriminates a user of the display unit issuing the browsing request; a delivery information generating device that generates a piece of delivery information by adding a piece of scenario information for each model representing a transition of a display range within each page of the content to which the browsing request is issued from the display unit, when an identical user discriminated by the user discriminating device has multiple display units of different models, the delivery information generating device generating the delivery information the content of which has added thereto multiple pieces of scenario information; and a delivery device that delivers the delivery information.

7 Claims, 11 Drawing Sheets

SERVER UNIT, BROWSING SYSTEM AND DELIVERY METHOD

BACKGROUND OF THE INVENTION

1. Field of the Invention

The present invention relates to a server unit, a browsing system and a delivery method capable of preventing the amount of delivery information from increasing even when many models are employed for display units by content subscribers, and capable of commonly managing a piece of delivery information among different models when an identical user owns multiple display units.

2. Description of the Related Art

There are provided digital book browsing systems which are configured to deliver a digital book such as a digital comic to mobile terminals such as mobile phones to allow users to browse the digital book on a screen of a mobile terminal. In such digital book browsing systems, compared to personal computers, many mobile terminals have a smaller size screens, and the screen size also varies depending on the model of the mobile terminal. Therefore, each model requires a piece of scenario information which represents a transition of a display range within each page of a digital book.

Japanese Patent Application Laid-Open No. 2011-33850 discloses a browsing system which is configured so that each delivery content is embedded with multiple pieces of scenario information each corresponding to each of the models accessible to the system and a display unit selects a piece of scenario information optimum thereto.

Japanese Patent Application Laid-Open No. 2006-221337 discloses a configuration, in which a piece of information on browsing circumstances of a browser is previously stored being associated with a browser's ID, and when a browsing request is received from a browsing terminal along with the browser's ID, an original digital document is converted based on the information on the browsing circumstances corresponding to the browser's ID, and the converted digital document is transmitted to the browsing terminal.

SUMMARY OF THE INVENTION

Japanese Patent Application Laid-Open No. 2011-33850 discloses the configuration in which the delivery content includes a piece of scenario information corresponding to all models accessible to the browsing system being embedded therein. Although there is little problem while the number of models of the display units accessible to the browsing system remains small, the amount of useless information included in the delivery information increases as the number of the models of the display units accessible to the browsing system increases.

Also, for a user who has plural display units of multiple different models, since it is required to manage the multiple kinds of contents while sorting the contents based on the model, another problem arises that the management of the contents gets troublesome. For example, in the case when a user has both of a mobile phone and a tablet terminal, it is required to separately manage the contents for the mobile phone and the contents for the tablet terminal.

The present invention has been proposed in view of the above circumstances. An object of the present invention is to provide a server unit, a browsing system, and a delivery method that are capable of preventing the amount of delivery information from increasing even when many different models are employed as the display units at the content subscribers; and even when an identical user has plural display units of multiple different models, and are capable of commonly managing a piece of delivery information among the plural display units owned by the identical user.

In order to achieve the object, the present invention provides a server unit, which includes: a browsing request receiving device that receives a browsing request for a piece of content constituted of one or multiple pages from a display unit; a user discriminating device that discriminates a user of the display unit issuing the browsing request; a delivery information generating device that generates a piece of delivery information by adding a piece of scenario information for each model representing a transition of a display range within each page of the content to which the browsing request is issued from the display unit, when an identical user discriminated by the user discriminating device has multiple display units of different models, the delivery information generating device generating the delivery information the content of which has added thereto multiple pieces of scenario information each corresponding to each of the models of the multiple display units owned by the identical user; and a delivery device that delivers the delivery information generated by the delivery information generating device to the display unit or an external storage accessible from the display unit.

In an embodiment of the present invention, the server unit further includes a model discriminating device that discriminates the model of the display unit issuing the browsing request based on the browsing request; and a storing device that stores the delivery information generated by the delivery information generating device for each of the users: wherein the delivery information generating device adds the scenario information corresponding to the model discriminated by the model discriminating device to the delivery information for each of the users stored in the storing device every time when the browsing request receiving device receives a browsing request from one of the multiple display units of different models owned by the identical user.

In another embodiment of the present invention, the server unit further includes a storing device that previously stores the models of the display units for each of the users, wherein the delivery information generating device adds multiple pieces of the scenario information to the content corresponding to each of the models for each of the users stored in the storing device.

Moreover, the present invention provides a browsing system which includes a server unit and a display unit set forth above, wherein the delivery device of the server unit delivers a piece of delivery information including multiple pieces of scenario information corresponding to only a user of the display unit issuing a browsing request to the display unit, the display unit selects a piece of the scenario information corresponding to the model of the display unit from the multiple pieces of the scenario information added to the delivery information and shifts a display range within each page of the content based on the scenario information.

Moreover, the present invention provides a browsing system, comprising a server unit, a display unit and an external storage accessible from the display unit set forth above, wherein the delivery device of the server unit delivers a piece of delivery information including multiple pieces of scenario information corresponding to only a user of the display unit issuing a browsing request to the external storage, the display unit acquires only a piece of scenario information corresponding to the model of the display unit in the multiple pieces of the scenario information added to the delivery information from the external storage and shifts a display range within each page of the content based on the scenario information.

Moreover, the present invention provides a delivery method, which includes: a browsing request receiving step to receive a browsing request for a piece of content constituted of one or multiple pages from a display unit capable of displaying the content; a user discriminating step to discriminate a user of the display unit issuing the browsing request; a delivery information generating step to generate a piece of delivery information by adding a piece of scenario information for each model representing a transition of a display range within each page of the content to which the browsing request is issued from the display unit, when an identical user discriminated in the user discriminating step has multiple display units of different models, the delivery information generating step generating the delivery information of the content of which has added thereto multiple pieces of scenario information each corresponding to each of the models of the multiple display units owned by the identical user; and a delivery step to deliver the delivery information generated in the delivery information generating step to the display unit or an external storage accessible from the display unit.

Moreover, the present invention provides a programmable storage medium tangibly embodying a program of machine-readable instructions executable by a digital processing apparatus to perform a delivery method. The program may be provided to a user being recorded in a recording medium such as an optical disk, a magnetic disk, memory card and the like.

According the present invention, the amount of delivery information is prevented from increasing even when many different models are employed for display units by content subscribers, and a piece of delivery information can be commonly managed among multiple display units of different models owned by an identical user.

DETAILED DESCRIPTION OF THE PREFERRED EMBODIMENTS

Referring to the appended drawings, embodiments of the present invention will be described in detail bellow.

First Embodiment

Figure 1:
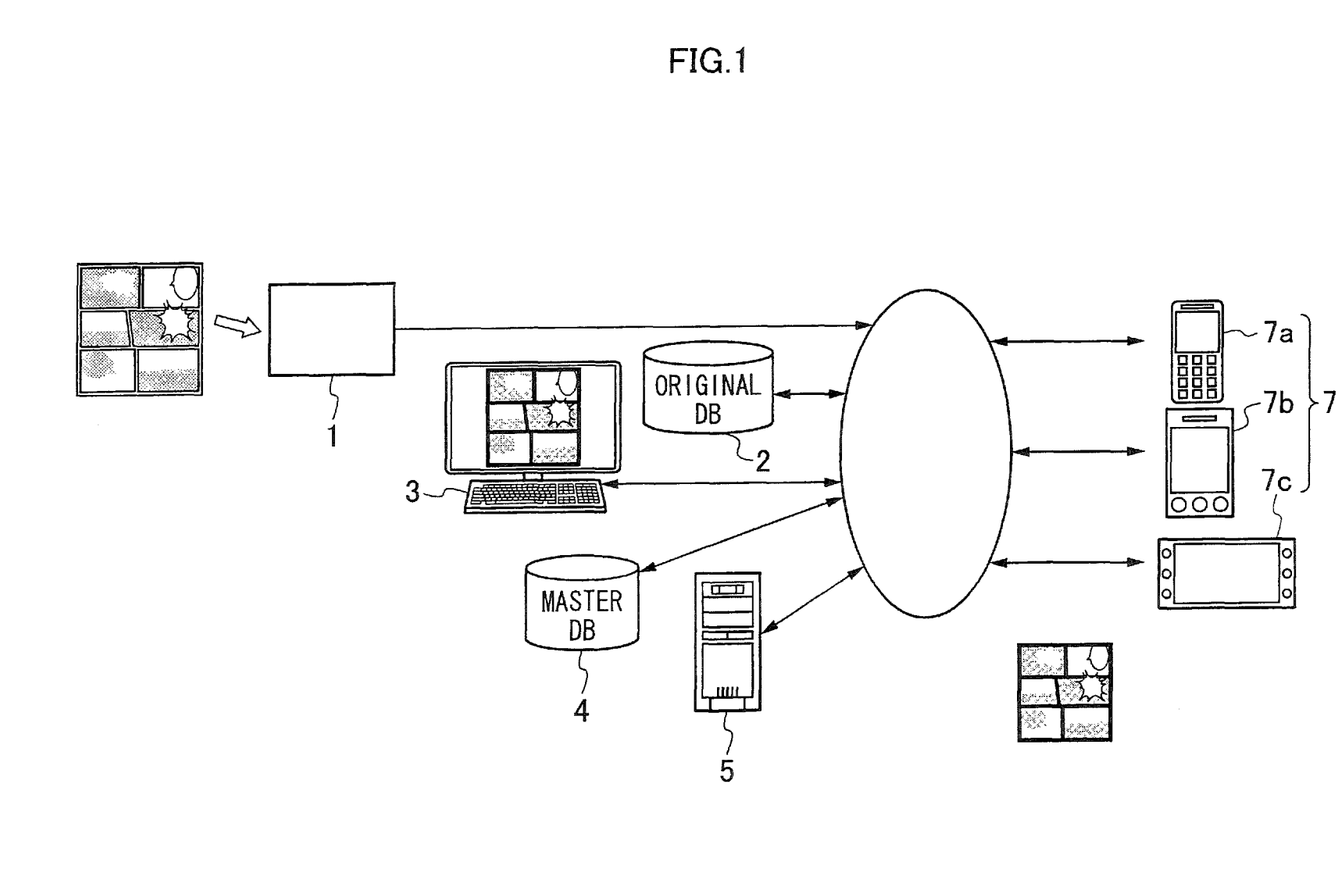
FIG. 1 illustrates the entire configuration of an example of a digital book browsing system.

FIG. 1 illustrates the entire configuration of an example of a digital book browsing system according to a first embodiment.

A scanner 1 reads an original of a comic (manga) on a sheet of paper to generate an image file which includes an image of each page of the comic (hereinafter, referred to as "page image"). FIG. 1 illustrates an example in which the image file is acquired by reading an original comic on a sheet of paper as an original which is scanned by the scanner 1, but the present invention is not limited to the above. The image file may be acquired by inputting an original comic which is electronically generated (digital original) via a network or a recording medium.

An original database (DB) 2 stores the image file generated by the scanner 1.

A digital comic editing unit 3 is an apparatus that edits a piece of digital comic data which includes the image file input through the scanner 1 or the like to generate a piece of master data of a digital comic. The digital comic editing unit 3 is constituted of, for example, a computer unit.

A master database 4 stores a piece of master data of the digital comic generated by the digital comic editing unit 3.

A server unit 5 converts the master data of the digital comic edited by the digital comic editing unit 3 into a piece of digital comic data of a format corresponding to each of display unit 7 (7a, 7b and 7c) as appropriate (hereinafter, the digital comic data may be referred to as "delivery information" in some cases). Receiving a browsing request (hereinafter, the browsing request may be referred to as "request" in some cases) from the display unit 7, the server unit 5 according to the embodiment delivers a piece of delivery information to the display unit 7 via a network. The server unit 5 is constituted of, for example, a computer unit.

The display unit 7 (7a, 7b and 7c) receives the delivery information transmitted from the server unit 5 and displays a page image (or frame image). The display unit 7 may be one of various types of mobile terminals such as a mobile phone, a tablet terminal, a game machine and the like; or may be one of various types of terminal units such as personal computer.

The size of the display screen of the display unit 7 varies depending on the model thereof. When the size of the display screen of the display unit 7 is smaller than the display size of the entire page image (hereinafter, referred to as "one page"), the display is performed, within one page, while shifting sequentially the display range corresponding to the size of the display screen of the display unit 7. To display the images sequentially on the display screen of the display unit 7 while shifting the display range corresponding to the size of the display screen within the page may be hereinafter referred to as "sequential reproduction" or "screen-feed reproduction".

A display unit with a reference numeral 7a is, for example, a mobile phone, which displays one page in multiple parts. A display unit with a reference numeral 7b is, for example, a tablet terminal which has a screen size larger than that of the mobile phone with the reference numeral 7a, and which displays one page in multiple parts but fewer than that of the mobile phone with the reference numeral 7a. When the size of the display screen of the tablet terminal is sufficiently large, one page may be displayed at once. A display unit with a reference numeral 7c is, for example, a game machine which has, in an ordinary posture, a horizontally-long display screen. When displaying a vertically-long page image in the ordinary posture, it is required to display one page in multiple parts.

The delivery information (digital comic data), which is transmitted to the display unit 7 from the server unit 5, is constituted of an image file (content) including a page image and an information file (a piece of collateral information) added to the content.

The page image is constituted of a high resolution image of each page (for example, 3000×5000 pixels or 1500×2000 pixels).

The information file is a piece of information corresponding to all pages (or each page) of the comic. The information file is written with, for example, a markup language such as XML file. The information file includes a piece of scenario information for each model as will be described later.

Figure 2:
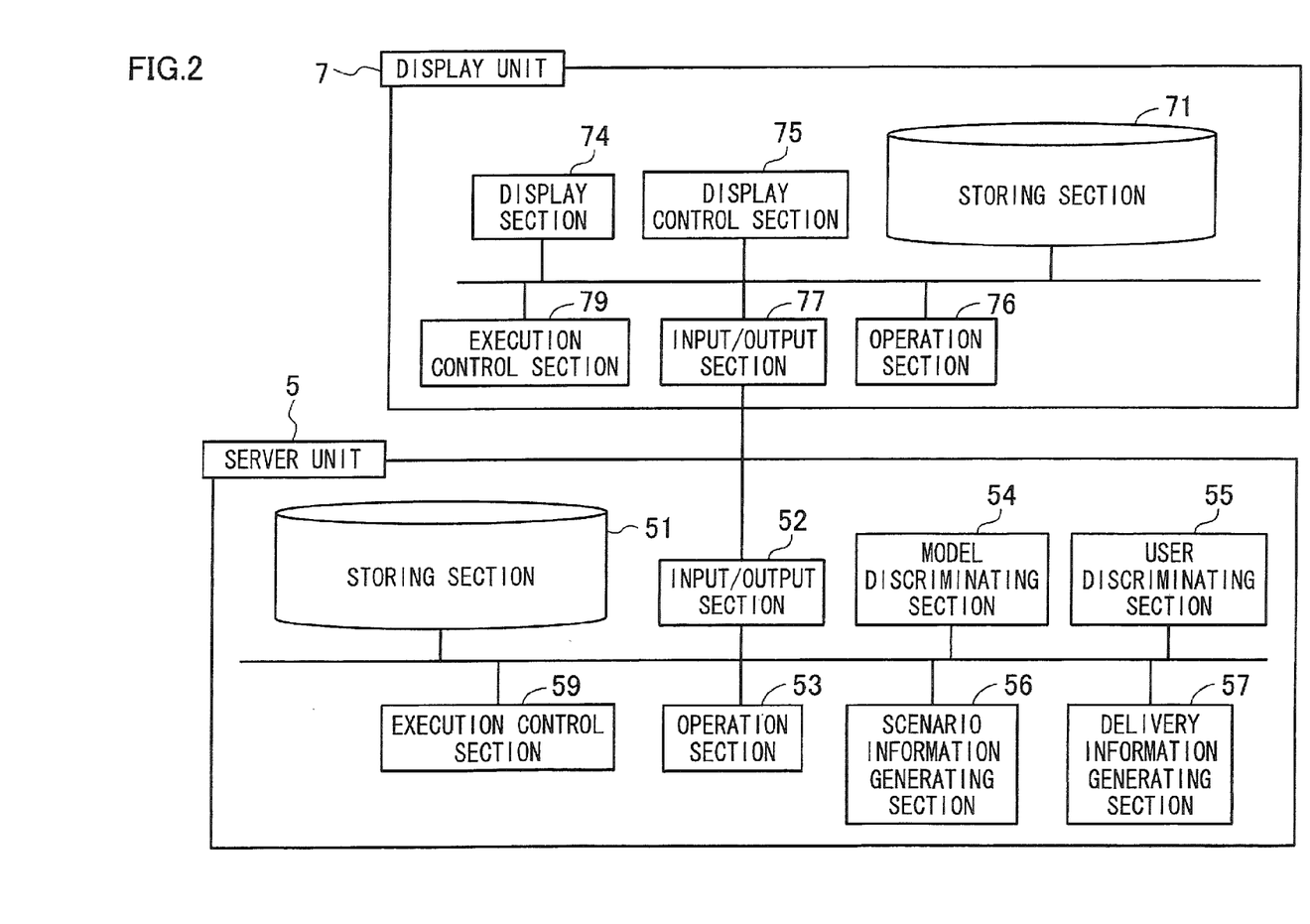
FIG. 2 is a block diagram illustrating an example of an internal configuration of a server unit and a display unit.

FIG. 2 is a block diagram illustrating an example of internal configuration of the server unit and the display unit.

Referring to FIG. 2, the server unit 5 includes a storing section 51, an input/output section 52, an operation section 53, a model discriminating section 54, a user discriminating section 55, a scenario information generating section 56, a delivery information generating section 57 and an execution control section 59.

The storing section 51 is constituted of a storage device such as a hard disk or a memory. The input/output section 52 according to the embodiment is constituted of a communication device. The operation section 53 is constituted of an operation device such as a keyboard, a mouse and a touchpad. Each of the model discriminating section 54, the user discriminating section 55, the scenario information generating section 56, the delivery information generating section 57 and the execution control section 59 is constituted of a control device such as a CPU (Central Processing Unit).

The model discriminating section 54 discriminates the model of a display unit 7 issuing a browsing request based on the browsing request. Various manners are available for discriminating the model. When the browsing request includes, for example, a piece of model information representing the model of the display unit 7, the model discriminating section 54 extracts the model information of the display unit 7 from the browsing request to discriminate the model. When the browsing request includes, for example, a piece of identification information (name, address or the like) of the display unit 7, the model discriminating section 54 extracts the identification information of the display unit 7 from the browsing request to discriminate the model based on the relation between the identification information and the model. Any known art may be employed for discriminating the model.

The user discriminating section 55 discriminates the user of the display unit 7 issuing a browsing request based on the browsing request. Various manners are available for discriminating the user. When the browsing request includes, for example, a piece of user information representing the user of the display unit 7, the user discriminating section 55 extracts the user information of the display unit 7 from the browsing request to discriminate the user. When the browsing request includes, for example, a piece of identification information (name, address or the like) of the display unit 7, the user discriminating section 55 extracts the identification information of the display unit 7 from the browsing request to discriminate the user based on the relation between the identification information and the user. Any known art may be employed for discriminating the user.

The scenario information generating section 56 generates a piece of scenario information for each model representing a transition of the display range within each page of the digital comic data (content).

The scenario information according to the embodiment is a transition line of a reference position (anchor position) for the display range within the page image (hereinafter, referred to as "anchor position transition line"). As for the kind of information for representing the anchor position transition line, various manners are available. A description is made below while giving an example of a case in which the scenario information generating section 56 generates an anchor position transition line constituted of an arrangement of coordinates of an anchor position within a page image.

The delivery information generating section 57 generates a piece of delivery information by adding, to a content to which a browsing request is issued from the display unit 7, a piece of scenario information for each model representing a transition of a display range within each page of the content. When it is determined that the identical user discriminated by the user discriminating section 55 has multiple display units 7 of different models, the delivery information generating section 57 generates a piece of delivery information in which the content has added thereto multiple pieces of scenario information corresponding to each of the display units 7 of multiple models owned by the identical user.

The execution control section 59 generally controls the each section on the server unit 5.

Referring to FIG. 2, the display unit 7 includes a storing section 71, a display section 74, a display control section 75, an operation section 76, an input/output section 77, and an execution control section 79.

The storing section 71 stores various kinds of information such as a piece of delivery information (digital comic data).

The display section 74 is display means which has a predetermined screen size and is constituted of a display device capable of displaying images thereon. The display section 74 is constituted of, for example, an LCD.

The display control section 75 controls to display the images of each display range sequentially on the display section 74 while shifting the display range within each page in accordance with the scenario information.

The operation section 76 receives an instruction input made by the user. The operation section 76 may be a touch sensor disposed on the screen of the display section 74, or a key input device or a pointing device. The operation section 76 according to the embodiment also functions as shift instruction input means which receives input of shift instruction (screen feed instruction) of a display range displayed on the display section 74.

The input/output section 77 inputs and outputs various kinds of information. The input/output section 77 according to the embodiment is constituted of a communication device that communicates with the server unit 5. The input/output section 77 transmits a browsing request to the server unit 5 and receives a piece of delivery information including an image file and a piece of scenario information from the server unit 5.

The execution control section 79 controls each section on the display unit 7 according to a program.

Now, the anchor position transition line as the scenario information generated by the scenario information generating section 56 according to the embodiment will be described referring to FIGS. 3 to 6.

Figure 3:
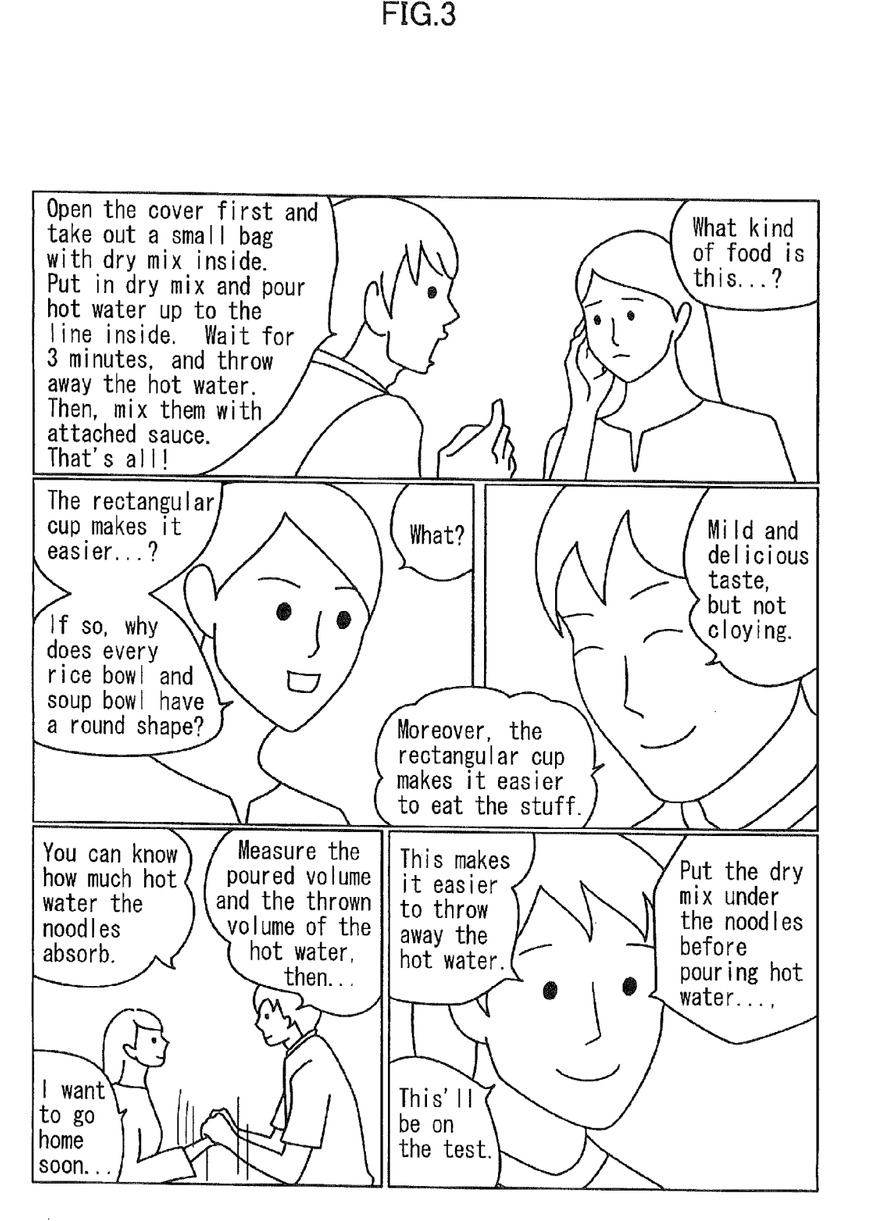
FIG. 3 shows an example of a page image of a digital comic.

FIG. 3 illustrates an example of a page image of a digital comic generated by the scanner 1.

Figure 4:
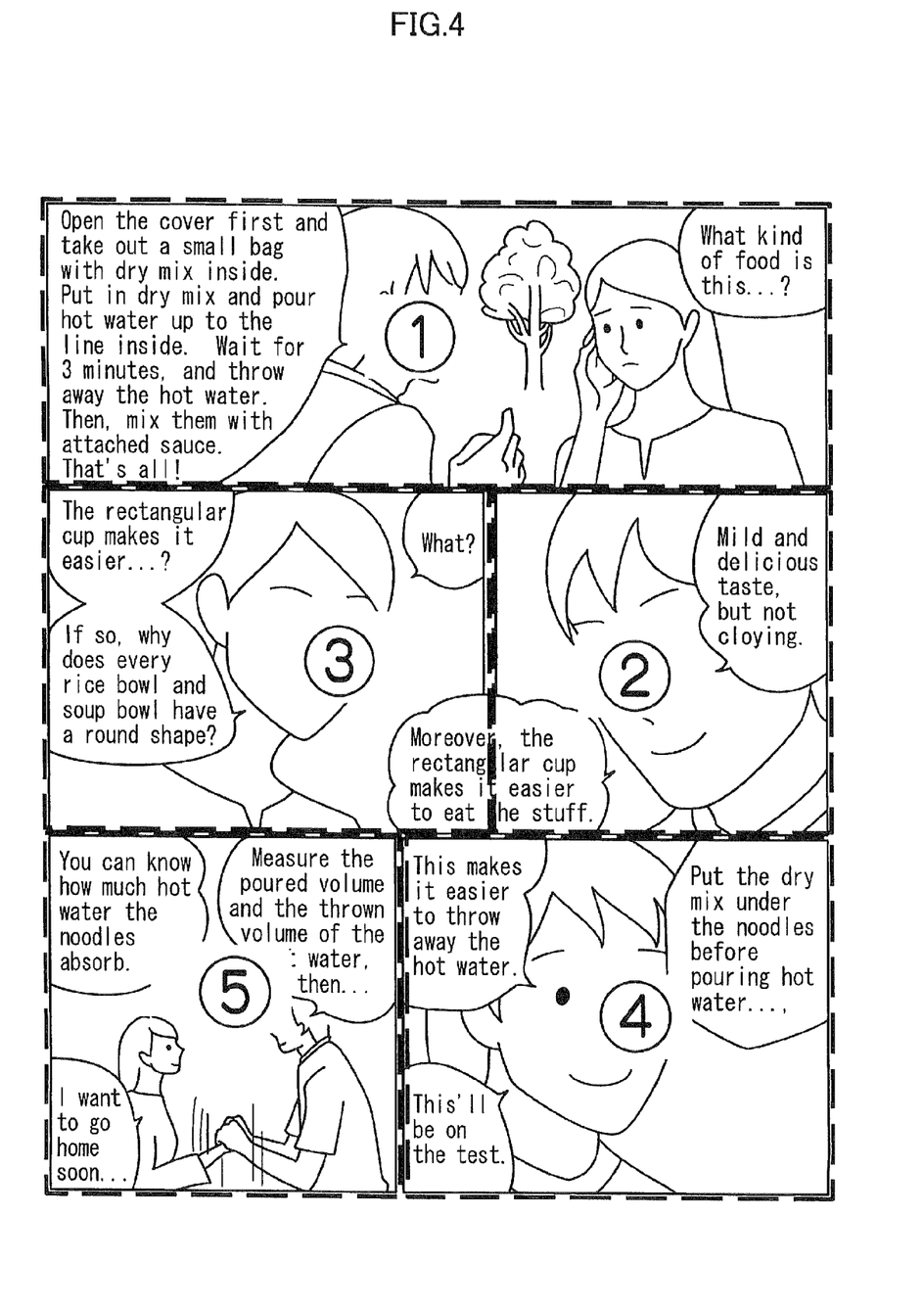
FIG. 4 illustrates an example of a display sequence in a frame.

FIG. 4 illustrates an example of a display sequence of the frames determined through a frame detection of the digital comic performed by the digital comic editing unit 3.

Figure 5:
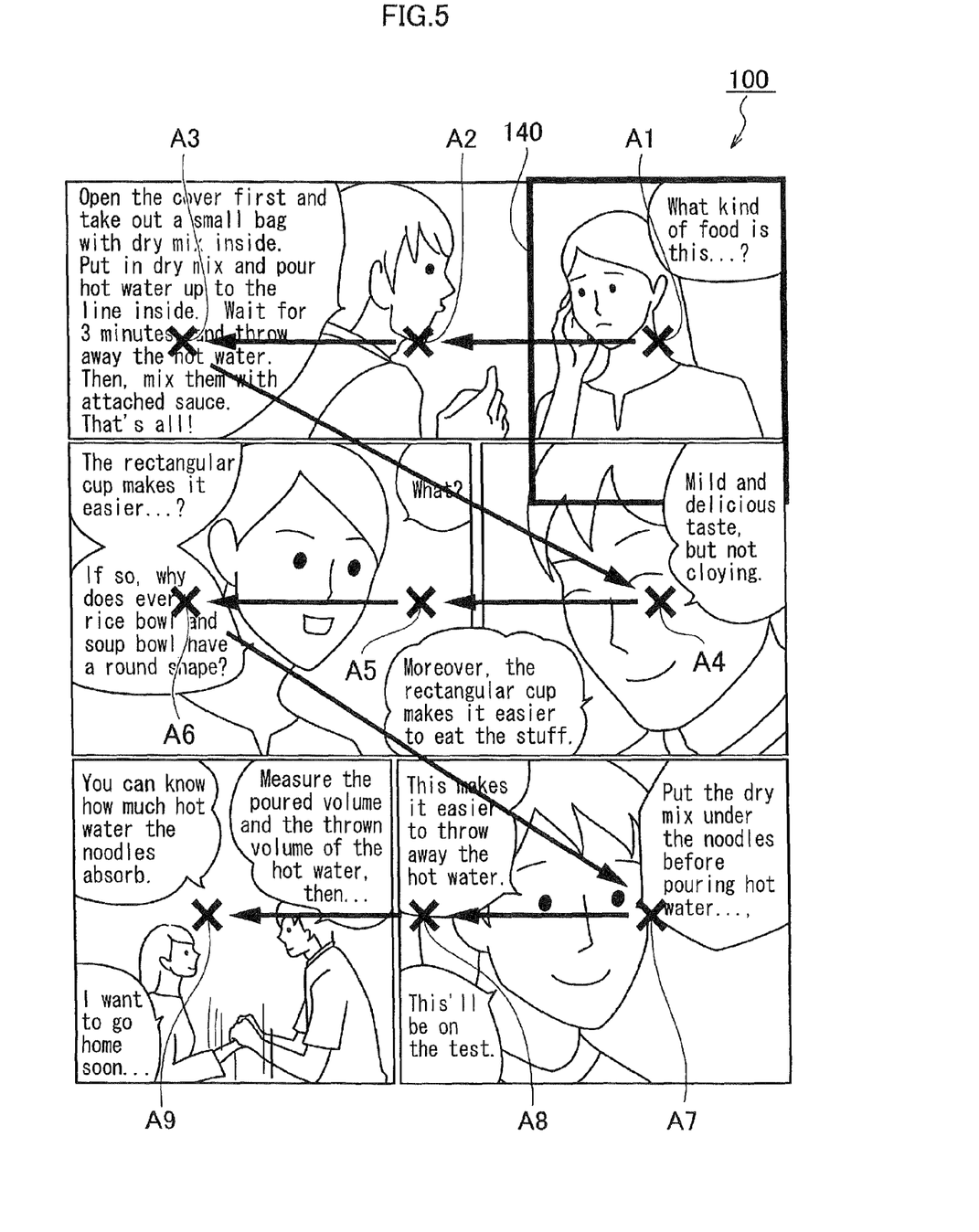
FIG. 5 shows an example of a piece of scenario information in a model with a small size display screen.

FIG. 5 illustrates an anchor position transition line as an example of the scenario information generated by the scenario information generating section 56 of the server unit 5. The anchor position transition line represents a transition of reference positions (anchor positions) for the display range 140 which is used for sequentially displaying the images on the display section 74 while sequentially shifting the display range 140 within the page image 100. The display range 140 corresponds to a screen size of the display section 74 of the display unit. In this example, the center of the display range 140 (indicated with "X" in FIG. 5) is defined as the anchor position. A transition of the anchor position is indicated with arrows in FIG. 5. That is, it is configured to sequentially shift the anchor position (transition) in a order of reference numerals A1, A2, A3, A4, A5, A6, A7, A8 and A9 in FIG. 5; such a series of transition (line) of the positions A1 to A9 is the anchor position transition line. The scenario information generating section 56 according to the embodiment generates an arrangement of the coordinates of the anchor positions A1 to A9 in the page image 100 as the anchor position transition line.

Figure 6:
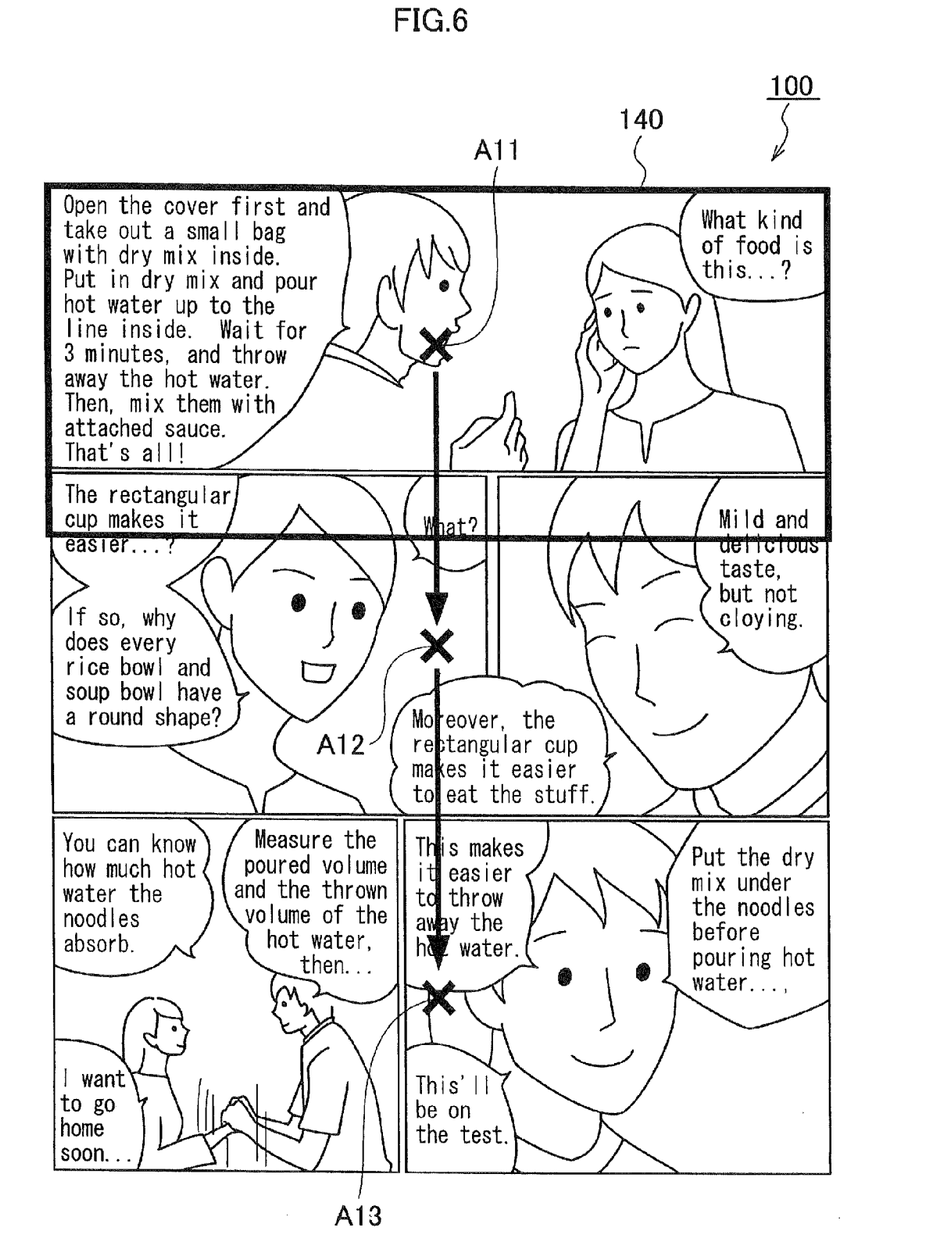
FIG. 6 shows another example of a piece of scenario information in a model with a large size display screen.

FIG. 6 illustrates an anchor position transition line in the case when the display section 74 on the display unit 7 has a larger size display screen. According to the embodiment, the center of the display range 140 (indicated with "X" in FIG. 6) is defined as the anchor position. The transition of the anchor position is indicated with arrows in FIG. 6. That is, the anchor position (transition) is configured to sequentially shift in an order of reference numerals A11, A12 and A13 in FIG. 6. Such series of the transition (line) of the positions of A1 to A9 is the anchor position transition line. The scenario information generating section 56 according to the embodiment generates an arrangement of the coordinates of the anchor positions A11 to A13 in the page image 100 as the anchor position transition line.

Figure 7:
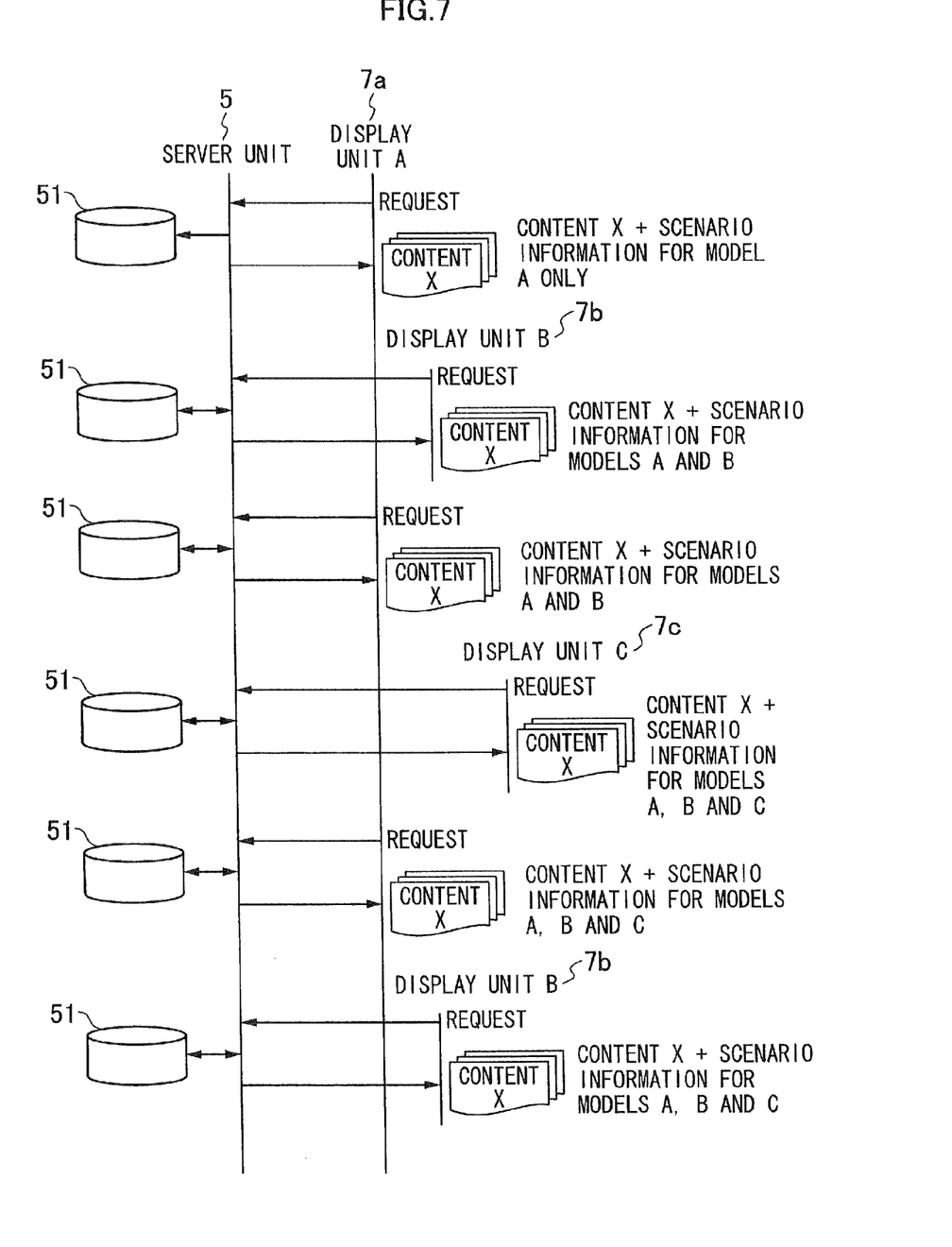
FIG. 7 is an illustration showing a first example of delivery processing in a browsing system according to a first embodiment.

FIG. 7 illustrates a first example of delivery processing in the browsing system according to the first embodiment. Here, it is assumed that an identical user owns a display unit 7a of model A, a display unit 7b of a model B and a display unit 7c of a model C; but it is assumed that the server unit 5 does not have any information that represents the model of the display unit owned by the user.

It is assumed that a display unit 7a of model A (for example, mobile phone) issues a request (browsing request) for a piece of content X to the server unit 5 for the first time. At this time, the model discriminating section 54 of the server unit 5 discriminates that the user owns the display unit 7a of model A based on the request. Therefore, the server unit 5 delivers the content X that includes only a piece of scenario information for model A to the display unit 7a of model A.

Then, it is assumed that a request (browsing request) for the piece of content X is issued from a display unit 7b of model B (for example, tablet terminal) to the server unit 5. The model discriminating section 54 of the server unit 5 discriminates that the identical user owns a display unit 7b of model B also in addition to the display unit 7a of model A based on the request. Therefore, the server unit 5 delivers the content X that includes the piece of scenario information for model A and the piece of scenario information for model B to the display unit 7b of model B.

It is assumed that a browsing request for the content X is issued again from the display unit 7a of model A (for example, mobile phone) to the server unit 5. Since the model discriminating section 54 of the server unit 5 has already discriminated that the identical user owns the display unit 7a of model A and the display unit 7b of model B as described above, the server unit 5 delivers the content X that includes a piece of scenario information for model A and a piece of scenario information for model B to the display unit 7a of model A.

Even when the browsing request for the content X is not issued again from the display unit 7a of model A (for example, mobile phone) to the server unit 5, the server unit 5 may deliver the content X that includes the scenario information for model A and the scenario information for model B to the display unit 7a of model A at the same time when the server unit 5 delivers the content X that includes the scenario information for model A and the scenario information for model B to the display unit 7b of model B.

It is assumed that a browsing request for the content X is issued from the display unit 7c of model C (for example, game machine) to the server unit 5. In this case, the model discriminating section 54 on the server unit 5 discriminates that the identical user also owns the display unit 7c of model C in addition to the display unit 7a of model A and the display unit 7b of model B based on the request. Therefore, the server unit 5 delivers the content X that includes the scenario information for model A, the scenario information for model B and the scenario information for model C to the display unit 7c of model C.

Then, it is assumed that a browsing request for the content X is issued again from the display unit 7a of model A (for example, mobile phone) to the server unit 5. Since the model discriminating section 54 on the server unit 5 has already discriminated that the identical user owns the display unit 7a of model A, the display unit 7b of model B and the display unit 7c of model C as described above, the server unit 5 delivers the content X that includes the scenario information for model A, the scenario information for model B and the scenario information for model C to the display unit 7a of model A.

It is assumed that a browsing request for the content X is issued from the display unit 7b of model B (for example, tablet terminal) to the server unit 5. Then, the server unit 5 delivers the content X that includes the scenario information for model A, the scenario information for model B and the scenario information for model C to the display unit 7b of model B.

Even when a browsing request for the content X is not issued again to the server unit 5 from the display unit 7a of model A, the server unit 5 may deliver the content X that includes the scenario information for model A, the scenario information for model B and the scenario information for model C to the display unit 7a of model A at the same time when the server unit 5 delivers the content X that includes the scenario information for model A, the scenario information for model B and the scenario information for model C to the display unit 7c of model C.

Also, even when the browsing request for the content X is not issued again to the server unit 5 from the display unit 7b of model B, the server unit 5 may deliver the content X that includes the scenario information for model A, the scenario information for model B and the scenario information for model C to the display unit 7b of model B at the same time when the server unit 5 delivers the content X that includes the scenario information for model A, the scenario information for model B and the scenario information for model C to the display unit 7c of model C.

Figure 8:
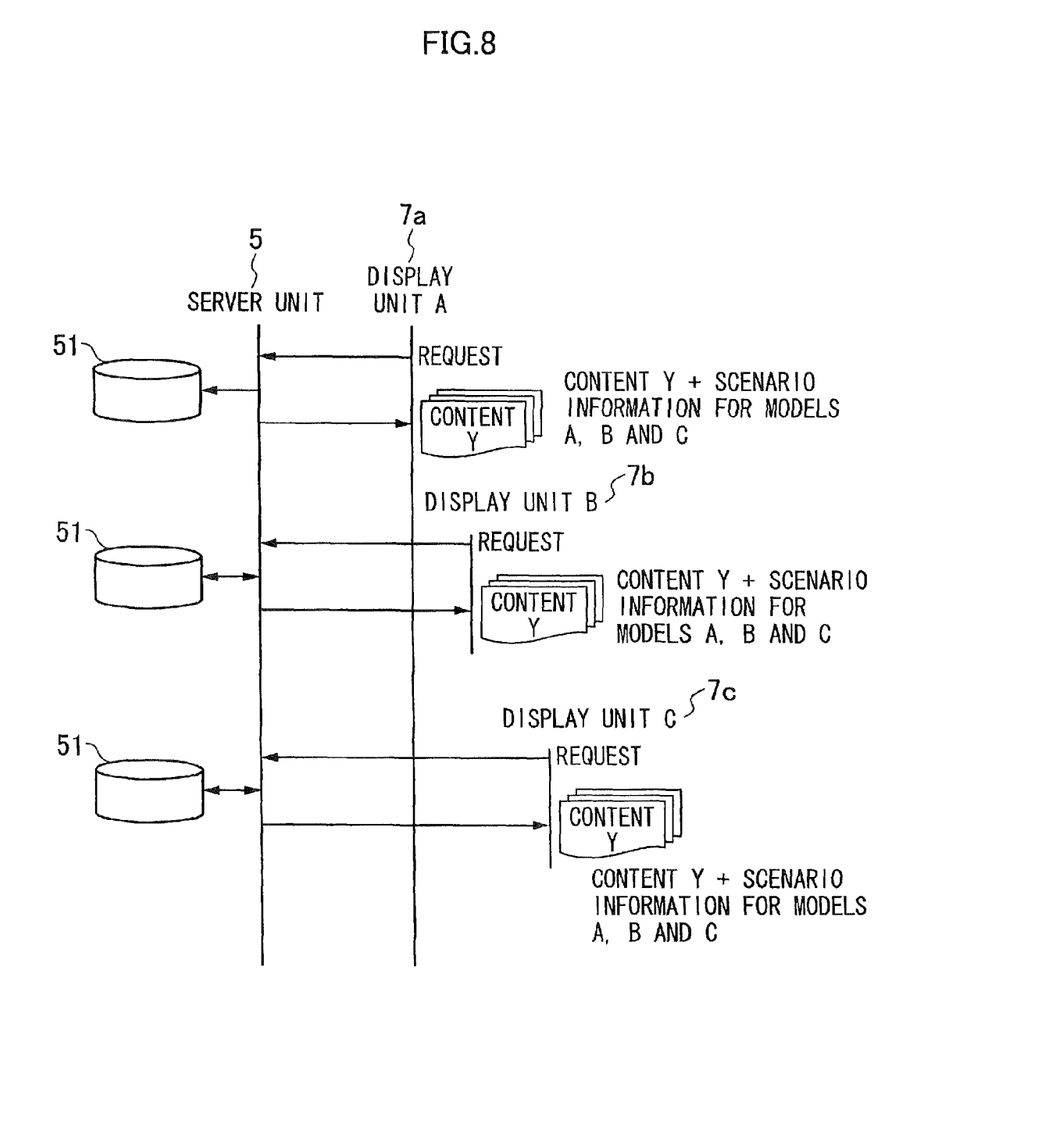
FIG. 8 is an illustration showing a second example of delivery processing in the browsing system according to the first embodiment.

FIG. 8 illustrates a second example of the delivery processing in the browsing system according to the first embodiment. Here, the case shown in FIG. 8 is the identical to the case shown in FIG. 7 in a point that the identical user owns the display unit 7a of model A, the display unit 7b of model B and the display unit 7c of model C. However, the server unit 5 already has the information that the user owns the display unit 7a of model A, the display unit 7b of model B and the display unit 7c of model C through the delivery processing shown in FIG. 7.

It is assumed that a request (browsing request) for a piece of content Y is issued from the display unit 7a of model A (for example, mobile phone) to the server unit 5 for the first time. Since the model discriminating section 54 on the server unit 5 has already discriminated that the identical user owns the display unit 7a of model A, the display unit 7b of model B and the display unit 7c of model C as described above, the server unit 5 delivers a piece of content Y that includes the scenario information for model A, the scenario information for model B and the scenario information for model C to the display unit 7a of model A.

Then, it is assumed that a request (browsing request) for the content Y is issued from the display unit 7b of model B (for example, tablet terminal) to the server unit 5. Since the model discriminating section 54 on the server unit 5 has already discriminated that the identical user owns the display unit 7a of model A, the display unit 7b of model B and the display unit 7c of model C as described above, the server unit 5 delivers the content Y that includes the scenario information for model A, the scenario information for model B and the scenario information for model C to the display unit 7b of model B.

Also, it is assumed that a request (browsing request) for the content Y is issued from the display unit 7c of model C (for example, game machine) to the server unit 5. Since the model discriminating section 54 on the server unit 5 has already discriminated that the identical user owns the display unit 7a of model A, the display unit 7b of model B and the display unit 7c of model C as described above, the server unit 5 delivers the content Y that includes the scenario information for model A, the scenario information for model B and the scenario information for model C to the display unit 7c of model C.

Figure 9:
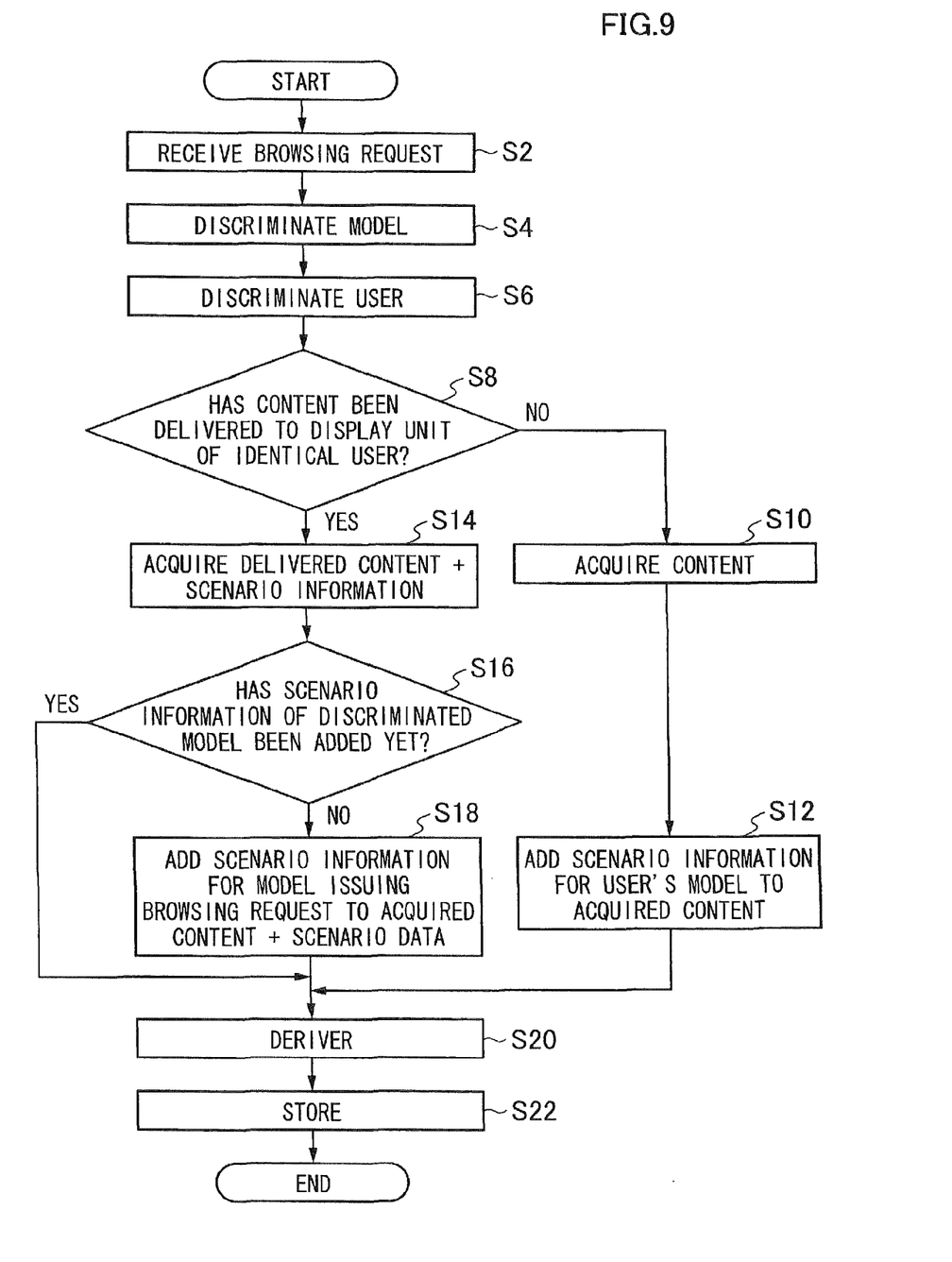
FIG. 9 is a flowchart showing an example of delivery processing in a server unit according to the first embodiment.

FIG. 9 is a flowchart showing an example of delivery processing in the server unit 5 according to the first embodiment. This processing is executed by the execution control section 59 on the server unit 5 in accordance with a program.

The input/output section 52 on the server unit 5 receives a browsing request (request) for a piece of content from the display unit 7 (any one of 7a, 7b and 7c) (step S2).

Then, the model discriminating section 54 on the server unit 5 discriminates the model of the display unit 7 issuing the browsing request based on the browsing request (step S4). The browsing request according to the embodiment includes plural pieces of model information. The model discriminating section 54 on the server unit 5 discriminates the model by extracting a piece of model information from the browsing request. The model may be discriminated through a piece of identification information (name, address, etc.) of the display unit 7 based on the browsing request. Any manner may be employed for discriminating the model.

Subsequently, the user discriminating section 55 on the server unit 5 discriminates the user of the display unit 7 issuing the browsing request based on the browsing request (step S6). The browsing request according to the embodiment includes a piece of user information. The user discriminating section 55 on the server unit 5 discriminates the user by extracting the user information from the browsing request. The user may be discriminated through the user identification information (name, address, etc.) of the display unit 7 based on the browsing request. Any manner may be employed for discriminating the user.

Subsequently, the execution control section 59 on the server unit 5 determines if the content requested for browsing has been delivered yet to the display unit 7 issuing the browsing request, which is owned by the identical user (step S8).

The storing section 51 on the server unit 5 according to the embodiment is configured so as, when delivering a piece of content as described later, to store a piece of history information concerning the content, the user and the model of the display unit 7. The execution control section 59 determines whether the content has been delivered to the display unit 7 of the identical user (to the identical display unit or another display unit of the identical user) based on the history information stored in the storing section 51 and the present browsing request.

When the content requested for browsing has not been delivered to the display unit 7 of the identical user (No in step S8), the input/output section 52 acquires the content requested for browsing from the master DB 4 (step S10); the scenario information generating section 56 on the server unit 5 generates a piece of scenario information for user's model; and the delivery information generating section 57 on the server unit 5 adds the scenario information for user's model to the acquired content (step S12).

For example, when the server unit 5 has not received or delivered yet any browsing request from any of the display units 7a, 7b and 7c of a specific user, and when a browsing request has been received for the first time from the display unit 7a of model A of a specific user, the scenario information for model A only is added to the content. Also, for example, when the server unit 5 has already received a browsing request of another content from the display unit 7a of model A of a specific user and delivered the content, and when a browsing request is received from the display unit 7b of model B of the specific user this time, the scenario information for model A and the scenario information for model B are added to the content. Also, for example, when the server unit 5 has already received a browsing request for another content from the display unit 7a of model A and the display unit 7b of model B of the specific user and delivered the same, and when a browsing request is received from the display unit 7c of model C of the specific user this time, the scenario information for model A, the scenario information for model B and the scenario information for model C are added to the content.

When the server unit 5 has already delivered a content requested for browsing to any one of the display unit 7a, 7b and 7c of the identical users, the delivery information (content that includes scenario information) which has been delivered to the display unit 7 of the user is acquired from the storing section 51 (step S14).

For example, when the server unit 5 has already received a browsing request for the content requested this time from the display unit 7a of model A of the specific user and delivered the same, the delivered content that includes scenario information A is acquired from the storing section 51. Also, for example, when the server unit 5 has already received a browsing request for the content requested this time from the display unit 7a of model A and the display unit 7b of model B of the specific user and delivered the same, the delivered content that includes the scenario information A and the scenario information B is acquired from the storing section 51. Also, for example, when the server unit 5 has already received a browsing request for the content requested this time from the display unit 7a of model A, the display unit 7b of model B and the display unit 7c of model C of the specific user and delivered the same, the delivered content that includes the scenario information A and the scenario information B and the scenario information C is acquired from the storing section 51.

Subsequently, it is determined if the acquired delivery information, which has been delivered, has added thereto the scenario information of the model which is discriminated in step S4 (step S16). When No in step S16, the acquired delivery information (content that includes the scenario information) has added thereto the scenario information of the display unit 7 issuing the browsing request (step S18).

For example, when a browsing request is issued from the display unit 7b of model B and when the delivered delivery information acquired from the storing section 51 does not have added thereto the scenario information for model B, the delivered delivery information (for example, the content that includes the scenario information A) has added thereto the scenario information for model B. Also, for example, when a browsing request is issued from the display unit 7c of model C, and when the scenario information for model C is not added to the delivered delivery information acquired from the storing section 51, the delivered delivery information (for example, the content that includes the scenario information A and the scenario information B) has added thereto the scenario information for model C.

The input/output section 52 on the server unit 5 delivers the delivery information (content that includes the scenario information) to the display unit 7 issuing the browsing request (step S20).

The delivery information (content that includes the scenario information) may be delivered to the display unit 7 which issues no browsing request (push-type delivery).

The execution control section 59 on the server unit 5 stores the delivery information (content that includes the scenario information) which is delivered this time in the storing section 51 (step S22). Here, the storing section 51 stores the history information concerning the delivered content, the user, the model of the display unit 7.

As described above, the first embodiment includes the model discriminating section 54 that discriminates the model of the display unit issuing a browsing request based on the browsing request and a storing section 51 that stores delivery information generated by the delivery information generating section 57 for each user. Every time when a browsing request is received from a display unit 7 of different model owned by the identical user from the input/output section 52, the delivery information generating section 57 adds a piece of scenario information corresponding to the model discriminated by the model discriminating section 54 to the delivery information for each user stored in the storing section 51. Therefore, even when the model information for each user is not previously registered, the server unit 5 recognizes the display unit 7 owned by each user every time when a browsing request is received; thereby the content in which multiple pieces of scenario information corresponding to each display unit 7 of the respective models owned by the user are added can be delivered.

Second Embodiment

Subsequently, a description is made on a browsing system according to a second embodiment. Description for the items which have been described in the first embodiment is omitted. Only the items that are different from those in the first embodiment are described.

According to the second embodiment, the storing section 51 on the server unit 5 previously stores models of the display units 7 for each user. The delivery information generating section 57 on the server unit 5 adds multiple pieces of scenario information each corresponding to every model of the users stored in the storing section 51 to the content.

Referring to FIG. 8, an example of delivery processing in the browsing system according to the second embodiment will be described below. Here, it is assumed that an identical user owns the display unit 7a of model A, the display unit 7b of model B and the display unit 7c of model C. The server unit 5 according to the second embodiment previously stores a piece of information concerning the model of the display units owned by the user in the storing section 51.

It is assumed that a request (browsing request) for a piece of content Y is issued first from the display unit 7a of model A (for example, mobile phone) to the server unit 5. Then, the execution control section 59 on the server unit 5 determines that the user of the display unit 7 issuing the browsing request owns the display units of models A, B and C based on the information from the storing section 51. Therefore, the server unit 5 delivers the content Y that includes the scenario information for model A, the scenario information for model B and the scenario information for model C to the display unit 7a of model A.

And then, it is assumed that a browsing request for the content Y is issued from the display unit 7b of model B (for example, tablet terminal) to the server unit 5. The execution control section 59 on the server unit 5 determines that the user of the display unit 7 issuing the browsing request owns the display units of models A, B and C based on the information from the storing section 51. Therefore, the server unit 5 delivers the content Y that includes the scenario information for model A, the scenario information for model B and the scenario information for model C to the display unit 7b of model B.

Then, it is assumed that a browsing request for the content Y is issued from the display unit 7c of model C (for example, game machine) to the server unit 5. The execution control section 59 on the server unit 5 determines that the user of the display unit 7 issuing the browsing request owns the display units of models A, B and C based on the information from the storing section 51. Therefore, the server unit 5 delivers the content that includes the scenario information for model A, the scenario information for model B and the scenario information for model C to the display unit 7c of model C.

That is, according to the second embodiment, even when a browsing request is issued from any one of the display units 7a, 7b and 7c of models A to C, when the display units 7 are owned by the identical user, the delivery information generating section 57 adds multiple pieces of scenario information (the scenario information for model A, the scenario information for model B and the scenario information for model C) each corresponding to each display unit 7a, 7b and 7c of models A to C owned by the identical user to the content to generate the delivery information.

Figure 10:
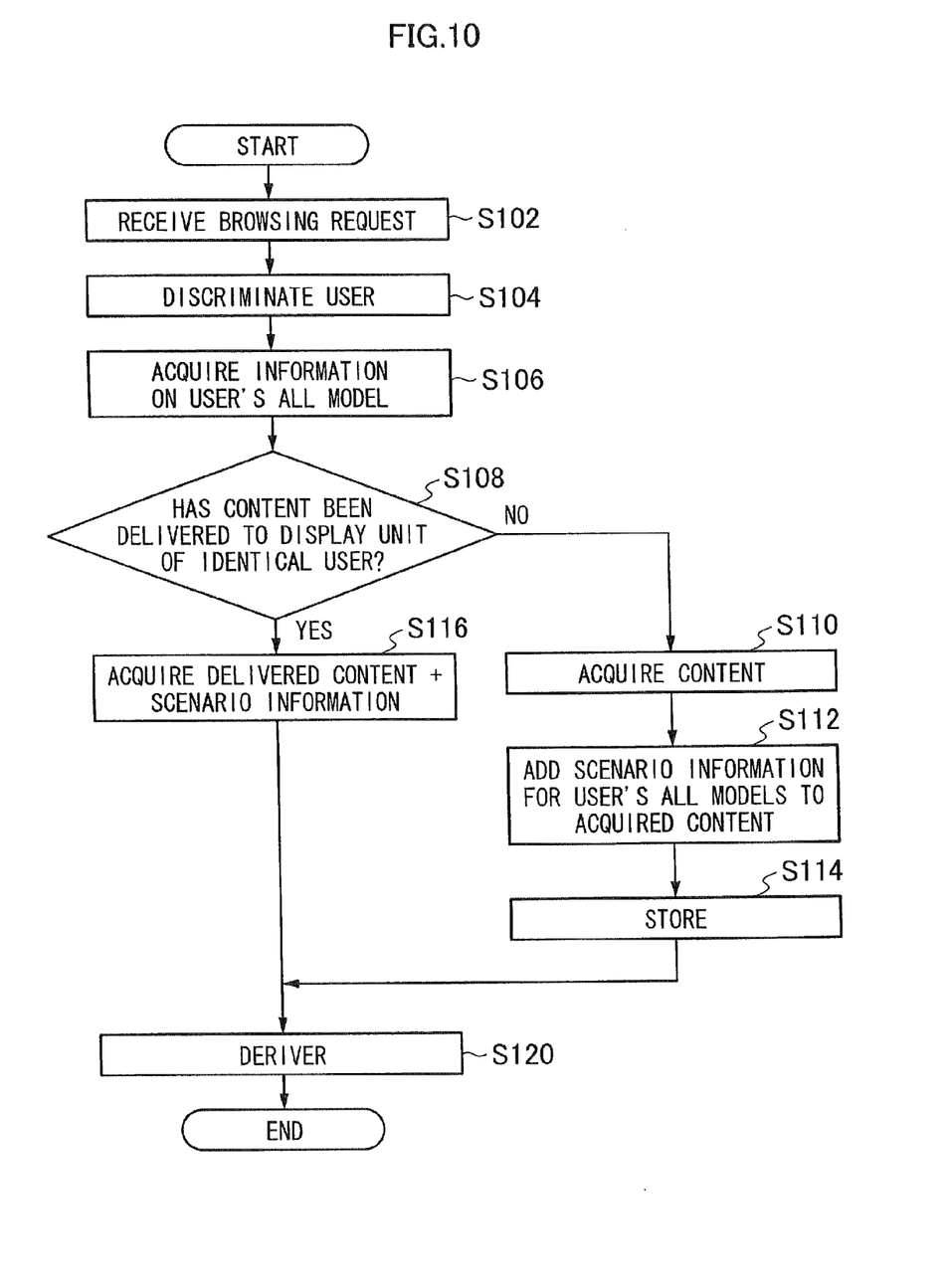
FIG. 10 is a flowchart showing an example of delivery processing in a server unit according to a second embodiment.

FIG. 10 is a flowchart showing an example of delivery processing in the server unit 5 according to the second embodiment. This processing is executed by the execution control section 59 on the server unit 5 in accordance with a program.

Since the steps S102 to S104 are identical to the steps S2 to S4 according to the first embodiment shown in FIG. 9, description thereof is omitted here.

In step S106, the execution control section 59 on the server unit 5 acquires a piece of information representing every model owned by the user discriminated in step S104. That is, according to the second embodiment, the storing section 51 on the server unit 5 previously stores the models of the display units 7 of each user, and the information representing every model owned by the user is acquired from the storing section 51.

In step S108, the execution control section 59 on the server unit 5 determines if the content requested for browsing has been delivered to the display unit 7 issuing the browsing request owned by the identical user.

When the content requested for browsing has not been delivered to the display unit 7 of the identical user (No in step S108), the input/output section 52 acquires the content requested for browsing from the master DB 4 (step S110), and the scenario information generating section 56 on the server unit 5 generates a piece of scenario information for the model owned by the user; and the delivery information generating section 57 on the server unit 5 adds multiple pieces of scenario information each corresponding to each models owned by the user to the acquired content (step S112). The delivery information in which the scenario information for every model is added to the content is stored in the storing section 51 on the server unit 5 (step S114).

When the content requested for browsing has been delivered to any one of the display units 7*a*, 7*b* and 7*c* owned by the identical user, the delivered delivery information (content that includes the scenario information for every model owned by the user) is acquired to the display unit 7 owned by the user from the storing section 51 (step S116).

The input/output section 52 on the server unit 5 delivers the delivery information (content that includes the scenario information for every model owned by the user) to the display unit 7 issuing the browsing request (step S120).

As described above, according to the second embodiment, the storing section 51 that previously stores models of the display units 7 of each user is provided, and the delivery information generating section 57 adds multiple pieces of scenario information corresponding to each of the models for each user stored in the storing section 51 to the content.

Third Embodiment

Subsequently, a description is made on a browsing system according to a third embodiment. Description for the items which have been described in the first embodiment is omitted. Only the items that are different from those in the first embodiment are described.

Figure 11:
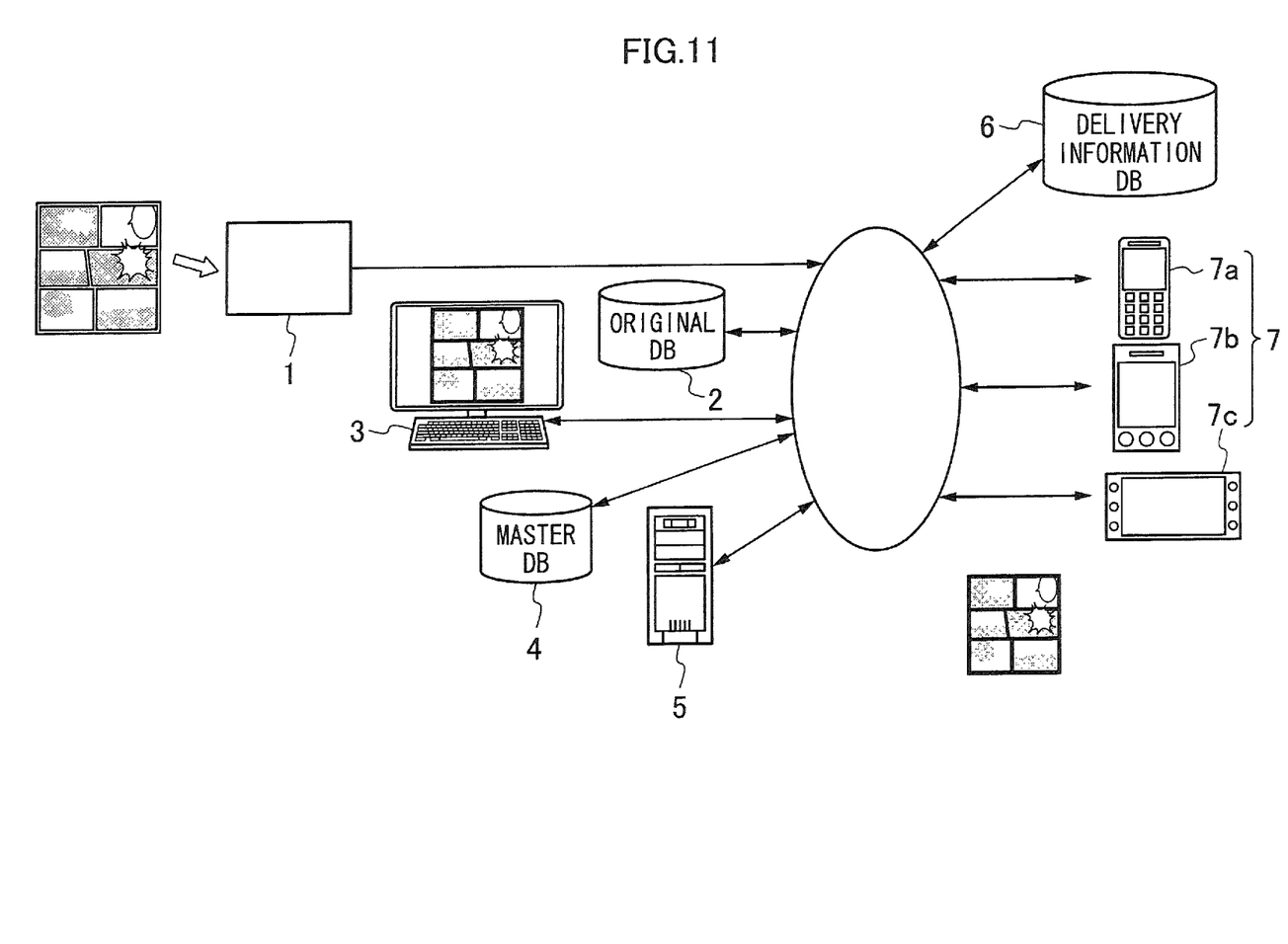
FIG. 11 illustrates the entire configuration of an example of a browsing system according to a third embodiment and a fourth embodiment.

FIG. 11 illustrates the entire configuration of an example of a browsing system according to the third embodiment. Difference from the browsing system according to the first embodiment shown in FIG. 1 is a point that the server unit 5 delivers a piece of delivery information constituted of a piece of content to which a piece of scenario information is added to a delivery information DB (database) 6 as an external storage in place of directly delivering the delivery information to the display unit 7.

The delivery information DB 6 is a storage device which is directly or indirectly accessible from the display unit 7. The input/output section 52 of the server unit 5 delivers a piece of delivery information that includes multiple pieces of scenario information corresponding to only the user of the display unit 7 issuing a browsing request to the delivery information DB 6. The display unit 7 acquires only a piece of scenario information corresponding to the model of the display unit 7 from the multiple pieces of scenario information to which the delivery information from the delivery information DB 6 is added, and shifts the display range within each page of the content based on the scenario information.

As for the manner that the display unit 7 acquires a necessary part in the delivery information from the delivery information DB 6, various manners are available. For example, the delivery information DB 6 may be virtually allotted as a part of storage area of the display unit 7, and a part of necessary portion only may be acquired from the information in the delivery information DB 6. Also, for example, only a necessary portion may be arbitrarily acquired from the delivery information via server unit 5 as a part of service of the server unit 5.

That is, the delivery information for each user is delivered from the server unit 5 to the delivery information DB for managing the delivery information for each user with the delivery information DB. The display unit 7 according to the third embodiment does not need to store the entire of the delivery information. Only a necessary portion (for example, content for each one page and scenario information of the page) may be arbitrarily acquired from the delivery information DB via a network such as crowd network.

Fourth Embodiment

Subsequently, a description is made on a browsing system according to a fourth embodiment. Description for the items that have been described in the second embodiment is omitted. Only the items which are different from those in the second embodiment are described.

The entire configuration of the browsing system is identical to that according to the third embodiment shown in FIG. 11. That is, in place of directly delivering the delivery information to the display unit 7, the server unit 5 delivers the delivery information to a delivery information DB 6 as an external storage.

The above description has been made while giving an example of the case of digital comic (manga). However, the present invention is applicable to the case when delivering other digital books (magazine, newspaper, novel, article etc constituted of digital data) other than digital comic.

The present invention is not limited to the examples described in this specification and the examples illustrated in the drawings. Needless to say, various kinds of design changes or modifications may be possible within a range within the spirit of the present invention.

What is claimed is:

1. A server unit, comprising:
a browsing request receiving device that receives a browsing request for a piece of content constituted of one or multiple pages from a display unit;
a user discriminating device that discriminates a user of the display unit issuing the browsing request;
a delivery information generating device that generates a piece of delivery information by adding a piece of scenario information for each model representing a transition of a display range within each page of the content to which the browsing request is issued from the display unit, when an identical user discriminated by the user discriminating device has multiple display units of different models, the delivery information generating device generating the delivery information the content of which has added thereto multiple pieces of scenario information each corresponding to each of the models of the multiple display units owned by the identical user;
a delivery device that delivers the delivery information generated by the delivery information generating device to the display unit or an external storage accessible from the display unit;
a model discriminating device that discriminates the model of the display unit issuing the browsing request based on the browsing request; and
a storing device that stores the delivery information generated by the delivery information generating device for each of the users,
wherein the delivery information generating device adds the scenario information corresponding to the model discriminated by the model discriminating device to the delivery information for each of the users stored in the storing device every time when the browsing request receiving device receives a browsing request from one of the multiple display units of different models owned by the identical user.

2. The server unit according to claim 1, wherein the storing device previously stores the models of the display units for each of the users,
wherein the delivery information generating device adds multiple pieces of the scenario information to the content corresponding to each of the models for each of the users stored in the storing device.

3. A browsing system, comprising a server unit and a display unit set forth in claim 1,
wherein the delivery device of the server unit delivers a piece of delivery information including multiple pieces of scenario information corresponding to only a user of the display unit issuing a browsing request to the display unit, and
the display unit selects a piece of the scenario information corresponding to the model of the display unit from the multiple pieces of the scenario information added to the delivery information and shifts a display range within each page of the content based on the scenario information.

4. A browsing system, comprising a server unit, a display unit and an external storage accessible from the display unit set forth in claim 1,
wherein the delivery device of the server unit delivers a piece of delivery information including multiple pieces of scenario information corresponding to only a user of the display unit issuing a browsing request to the external storage, and
the display unit acquires only a piece of scenario information corresponding to the model of the display unit in the multiple pieces of the scenario information added to the delivery information from the external storage and shifts a display range within each page of the content based on the scenario information.

5. A browsing system, comprising a server unit and a display unit set forth in claim 2,
wherein the delivery device of the server unit delivers a piece of delivery information including multiple pieces of scenario information corresponding to only a user of the display unit issuing a browsing request to the display unit, and
the display unit selects a piece of the scenario information corresponding to the model of the display unit from the multiple pieces of the scenario information added to the delivery information and shifts a display range within each page of the content based on the scenario information.

6. A browsing system, comprising a server unit, a display unit and an external storage accessible from the display unit set forth in claim 2,
wherein the delivery device of the server unit delivers a piece of delivery information including multiple pieces of scenario information corresponding to only a user of the display unit issuing a browsing request to the external storage, and
the display unit acquires only a piece of scenario information corresponding to the model of the display unit in the multiple pieces of the scenario information added to the delivery information from the external storage and shifts a display range within each page of the content based on the scenario information.

7. A delivery method, comprising:
a browsing request receiving step to receive a browsing request for a piece of content constituted of one or multiple pages from a display unit capable of displaying the content;
a user discriminating step to discriminate a user of the display unit issuing the browsing request;
a delivery information generating step to generate a piece of delivery information by adding a piece of scenario information for each model representing a transition of a display range within each page of the content to which the browsing request is issued from the display unit, when an identical user discriminated in the user discriminating step has multiple display units of different models, the delivery information generating step generating the delivery information of the content of which has added thereto multiple pieces of scenario information each corresponding to each of the models of the multiple display units owned by the identical user;
a delivery step to deliver the delivery information generated in the delivery information generating step to the display unit or an external storage accessible from the display unit;
a model discriminating step to discriminate the model of the display unit issuing the browsing request based on the browsing request; and
a storing step to store the delivery information generated by the delivery information generating device for each of the users,
wherein the delivery information generating step adds the scenario information corresponding to the model discriminated by the model discriminating step to the delivery information for each of the users stored in the storing device every time when in the browsing request receiving step a browsing request from one of the multiple display units of different models owned by the identical user is received.

* * * * *